Sept. 18, 1934.  E. M. McILWEE  1,973,908
ILLUMINATING MIRROR
Filed Dec. 27, 1932

INVENTOR
EILEEN MAY McILWEE
BY
ATTORNEY

Patented Sept. 18, 1934

1,973,908

UNITED STATES PATENT OFFICE 1,973,908

ILLUMINATING MIRROR

Eileen May McIlwee, San Diego, Calif.

Application December 27, 1932, Serial No. 649,013

4 Claims. (Cl. 240—4.1)

This invention relates in general to mirrors, and more particularly to a combination rear vision and vanity mirror adapted for both day and night use.

An important object of the invention is to provide an improved mirror which may be conveniently mounted upon an automobile and utilized both as a rear vision mirror and as a vanity mirror in the daytime as well as in the night-time; there being a novel lighting arrangement associated therewith whereby the mirror will better reflect the face of a lady looking thereinto to prepare her toilet.

Another object of the invention is to provide for the occupants of the tonneau of an automobile a morror of the above character which is portable and which when not in use may be placed in the side pockets of a car.

Still other objects of an important nature will hereinafter appear:

Referring to the drawing which illustrates a preferred embodiment of the invention:

Figure 1:
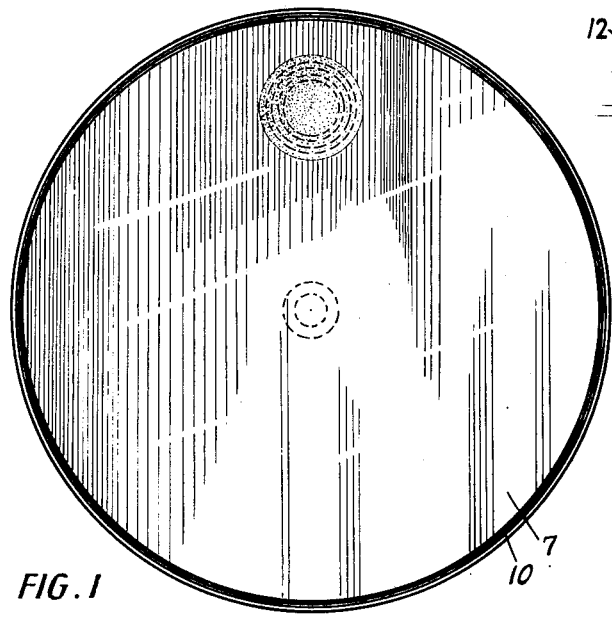
Fig. 1 is a face view of the device.

Referring in detail to the drawing, the invention comprises a main glass disk 7 possessing a high degree of light transmissibility. Said disk is provided over its back face with a reflecting coating 8 of any suitable material. Over the back face of said plate 7 also extends a backing sheet or plate 9 which is provided with an inturned peripheral flange 10 which grips the periphery of the plate 7, the hold of said flange upon the plate being rendered more secure by reason of the edge of the plate being beveled as shown.

Within the boundary of the reflecting area of the mirror is included a non-reflecting area 11, said plate 7 being recessed in a fractionally spherical manner throughout said non-reflecting area. In the central portion of the depression thus formed is a coating 12 of a rather dense opacity, there being around this coating 12 an annular zone which is overlaid by a coating 13 of less opacity, which occupies the peripheral portion of the concavity, extended to the silvered or otherwise coated portion which covers the reflecting part of the mirror said coatings form a light transmitting portion of variable opacity.

Around the peripheral portion of said concavity the back sheet 9 is provided with a backwardly projecting annular flange 14 having an internal annular recess or groove 15. Within said flange 14 is fitted a lamp socket member 16 having an external annular flange 17 provided with an external annular bead 18 which fits within said annular groove 15 in order to detachably support said lamp socket. Within said socket 17 is fitted a lamp 19 having a globe 20. When said lamp is thus supported in its operative position a considerable portion of the lamp globe 20 projects into the recess 11. When the article is used at night the face of the user will thus be protected from a glaring light, but will nevertheless be sufficiently lighted up to be clearly visible in the mirror. Glare from the lamp 20 is prevented without needless waste of the light therefrom, by the provision of the two coatings 12 and 13 of different degrees of opacity, already described.

Figure 3:
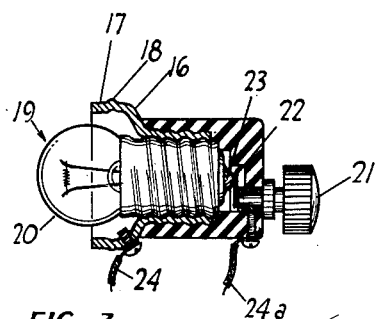
Fig. 3 is a sectional detail of the light socket.

The lamp socket shown in Fig. 3 is provided with a rotary switch button 21 having a radial switch arm 22 cooperating with the contact 23 of the lamp to control the circuit which is conducted by means of the wires 24 and 24a.

Figure 2:
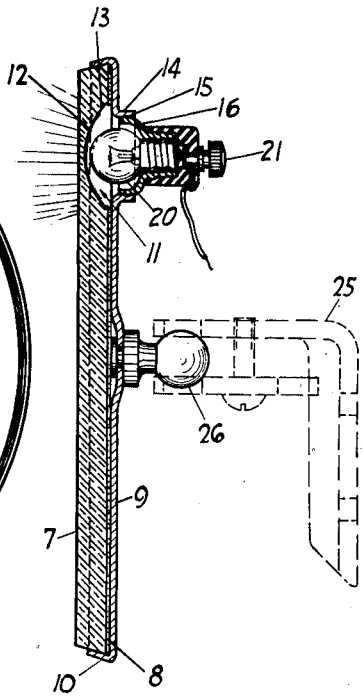
Fig. 2 is a vertical mid-sectional view, there being a mounting bracket shown dottedly.

In Fig. 2 is shown in broken lines a mounting bracket 25 whereby the device may be attached to the framework of an automobile.

Figure 4:
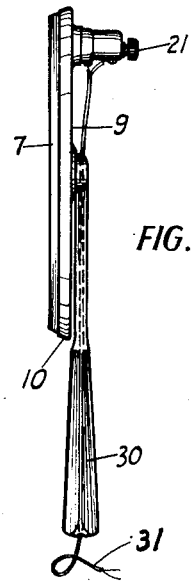
Fig. 4 is a side elevation of a portable mirror illustrating another embodiment of the invention.

In Fig. 4 the mirror is shown provided with a handle 30 through which extends the conducting cord 31 to supply current to the lamp, said cord being connectible with any suitable source of current which may be available.

Figure 5:
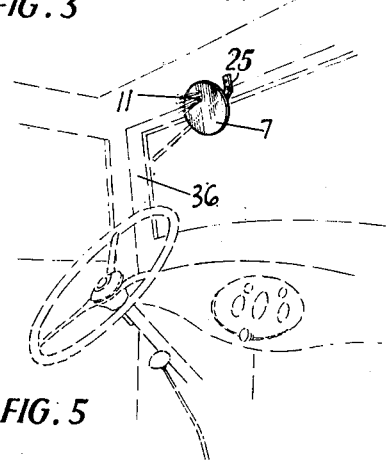
Fig. 5 is a perspective view showing a fragmentary portion of the driver's compartment with the device mounted therein for the two-fold use of rear vision and vanity purposes.

In Fig. 5 the device is shown mounted in the driver's compartment of the car whereby it is utilized for the double purpose of rear vision and as a means whereby facial conditions may be attended to as the toilet may require. In this view the mirror arm 25 is secured to the framework 36 and the non-reflecting area 11 is located in the upper portion of the mirror disk 7, as in the other view.

From the foregoing description the construction of the device and its various uses will be readily understood. It is deemed to be of especial value as an automobile accessory in which situation, owing to the modern tendency to multiply equipment, it is particularly desirable that each individual device be capable of as great a variety of use as possible.

I claim:

1. A mirror having a reflecting area and a relatively small non-reflecting area included within the boundary of said reflecting area, said non-reflecting area consisting of a concavity in the back face of the mirror, a light tight compartment mounted rearwardly of said concavity, a zone of opaque material occupying the central portion of said concavity, an annular zone of lesser opacity surrounding said central zone, and a lamp to project a dimmed light through said annular zone to illuminate an object being viewed in the reflecting area of the mirror.

2. A mirror having a glass plate which is coated on one face to provide a light-reflecting area, a backing plate or sheet overlying the coated face of said glass plate, said backing plate having a peripheral flange which projects from one side thereof and grips the periphery of said glass plate, said glass plate having a recess extending thereinto from the back face thereof and constituting a light-transmitting portion and said backing plate having an annular flange surrounding said recess, and a lamp to project light through said recessed portion of the mirror, said lamp having a casing which engages said flange and is thereby supported in an operative position.

3. In a mirror, a reflecting plate, a back plate having an integral annular backwardly directed flange which surrounds a relatively small space which is recessed in a fractionally spherical manner; and a lamp having a tubular casing which fits friction-tight within said tubular flange, said reflecting plate being at least partially transparent throughout said small space, and the light of said lamp when the latter is in operation, penetrating said space, there being a coating over said space to partly obscure the light passing therethru, said coating consisting of a central part of relatively dense opacity surrounded by a zone of coating of less opacity.

4. In a mirror, a reflecting plate a portion of which is recessed in a fractional spherical manner, a coating of variable opacity to render said recessed portion at least partially transparent, a back plate overlying said reflecting plate, said back plate having a flange which projects from one side thereof and grips the edge of said reflecting plate, said back plate having an annular flange surrounding said recessed portion, and a lamp to project light thru the recessed portion of said reflecting plate, said lamp having a casing which engages said annular flange and is thereby supported in an operative position.

EILEEN MAY McILWEE.